(12) United States Patent
Liu

(10) Patent No.: US 9,989,181 B2
(45) Date of Patent: Jun. 5, 2018

(54) QUICK DISCONNECT SINGLE SHUTOFF FITTING FOR PHASE CHANGING MATERIAL

(71) Applicant: Xerox Corporation, Norwalk, CT (US)

(72) Inventor: Annie Liu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 22 days.

(21) Appl. No.: 15/069,240

(22) Filed: Mar. 14, 2016

(65) Prior Publication Data

US 2017/0261141 A1 Sep. 14, 2017

(51) Int. Cl.
*F16L 37/107* (2006.01)
*F16L 37/407* (2006.01)

(52) U.S. Cl.
CPC .......... *F16L 37/407* (2013.01); *F16L 37/107* (2013.01)

(58) Field of Classification Search
CPC ....... F16L 37/407; F16L 37/107; F16L 37/24; F16K 15/02
USPC .......... 137/515, 515.5; 251/65, 149.6, 149.8, 251/149.9, 149, 149.1
See application file for complete search history.

(56) References Cited

U.S. PATENT DOCUMENTS

| | | | | |
|---|---|---|---|---|
| 2,735,696 A | * | 2/1956 | Omon | F16L 37/23 137/540 |
| 2,800,343 A | * | 7/1957 | Ulrich | F16L 37/107 137/614.04 |
| 3,491,790 A | * | 1/1970 | Sanford | F16K 15/04 137/533.11 |
| 5,215,538 A | * | 6/1993 | Larkin | A61M 39/26 137/516.13 |
| 5,520,665 A | * | 5/1996 | Fleetwood | A61M 39/26 604/246 |

(Continued)

OTHER PUBLICATIONS http://catalog.beswick.com/#WORKFLOW;PRODUCT,QDC-101-I-DS_Internal,FILTER_QUICK_DISCONNECTS, last accessed Mar. 14, 2016.

(Continued)

*Primary Examiner* — Craig Schneider
*Assistant Examiner* — P. Macade Nichols
(74) *Attorney, Agent, or Firm* — Simpson & Simpson, PLLC

(57) ABSTRACT

A disconnect fitting adapted for use with a phase changing composition including a fitting base having a first fitting base end, a second fitting base end and a fitting base opening therebetween, a pin capture disposed within the fitting base opening, a displaceable pin secured within the pin capture, a fitting socket having a first fitting socket end, a second fitting socket end, a fitting socket opening therebetween, the second fitting socket end secured to the second fitting base end, and a valve at least partially disposed within the fitting socket opening. When the displaceable pin is in an unloaded condition, the displaceable pin extends in a direction of the second fitting base end, and when the displaceable pin is in a loaded condition, the displaceable pin is compressed in a direction of the first fitting base end. The pin capture permits passage of the phase changing composition through the fitting base opening when the displaceable pin is in the unloaded condition or the loaded condition. The disconnect fitting permits a secure connection of the fitting base and the fitting socket regardless of the state the material when the base and socket are disconnected.

21 Claims, 7 Drawing Sheets

(56) References Cited

U.S. PATENT DOCUMENTS

2008/0289702 A1* 11/2008 Aragones ................ F16L 37/32
137/515

OTHER PUBLICATIONS http://www.cpcworldwide.com/productlist.aspx?Series=11&Category=44&Product=356, last accessed Mar. 14, 2016.
http://www.kentsystems.com/index.php?file=c-con_product_details&iProductId=NDk1&iCategoryId=MTcw, last accesses Mar. 14, 2016.

* cited by examiner

QUICK DISCONNECT SINGLE SHUTOFF FITTING FOR PHASE CHANGING MATERIAL

TECHNICAL FIELD

The presently disclosed embodiments are directed to providing a quick disconnect, more particularly to a quick disconnect including a shutoff valve, and even more particularly to a quick disconnect including a shutoff valve usable with materials that transition between solid and liquid phases.

BACKGROUND

Typical fluid fittings or couplings having at least one shutoff valve require some vertical displacement of components in order to seal/close and to reconnect. Such valves possess inherent drawbacks when used with phase changing materials. A phase changing material transitions from liquid to solid as it cools and from solid to liquid as it heats. In solid form, the phase changing material does not allow for displacement of valve components. This issue is particularly troublesome when the shutoff valve components, i.e., the displaceable components, are connected to or near the end where the phase changing material enters the fitting. Under these circumstances, the fitting is incapable of making a complete connection. Various methods of accommodating this issue have been developed. For example, an operator may wait until the machine cools, the phase changing material solidifies and the fitting is then disconnected, thus preserving the location of the shutoff valve. The foregoing method requires a significant amount of down time for machines to facilitate the cooling.

Known fittings intended to solve the foregoing problem are large, e.g., typically spanning almost five inches in diameter. Another solution includes heating the valve or shutoff fitting. Although the foregoing method maintains the phase changing material in a liquid state, other issues may be created, e.g., leaking of the phase changing material.

This disclosure sets forth a quick disconnect that solves the foregoing drawbacks as well as other drawbacks of known disconnect valves by providing a smaller fitting capable of making secured and sealed connections even if the fitting is disconnected while a phase changing material is in a fluid state and subsequently left to solidify.

SUMMARY

Broadly, the present disclosure addresses a quick disconnect shutoff valve for use with phase changing materials.

According to aspects illustrated herein, there is provided a disconnect fitting adapted for use with a phase changing composition including a fitting base, a pin capture and a displaceable pin. The fitting base includes a first fitting base end, a second fitting base end and a fitting base opening therebetween, the pin capture is disposed within the fitting base opening, and the displaceable pin is secured within the pin capture. When the displaceable pin is in an unloaded condition, the displaceable pin extends in a direction of the second fitting base end, and when the displaceable pin is in a loaded condition, the displaceable pin is compressed in a direction of the first fitting base end. The pin capture permits passage of the phase changing composition through the fitting base opening when the displaceable pin is in the unloaded condition or the loaded condition.

According to other aspects illustrated herein, there is provided a disconnect fitting adapted for use with a phase changing composition including a fitting base, a pin capture, a displaceable pin, a fitting socket and a valve. The fitting base includes a first fitting base end, a second fitting base end and a fitting base opening therebetween. The pin capture is disposed within the fitting base opening, while the displaceable pin is secured within the pin capture. The fitting socket includes a first fitting socket end, a second fitting socket end, a fitting socket opening therebetween. The second fitting socket end is secured to the second fitting base end. The valve is at least partially disposed within the fitting socket opening. When the displaceable pin is in an unloaded condition, the displaceable pin extends in a direction of the second fitting base end, and when the displaceable pin is in a loaded condition, the displaceable pin is compressed in a direction of the first fitting base end. The pin capture permits passage of the phase changing composition through the fitting base opening when the displaceable pin is in the unloaded condition or the loaded condition.

According to still other aspects illustrated herein, there is provided a printing device including a phase changing composition and a disconnect fitting adapted for use with the phase changing composition. The disconnect fitting includes a fitting base, a pin capture, a displaceable pin, a fitting socket and a valve. The fitting base includes a first fitting base end, a second fitting base end and a fitting base opening therebetween. The pin capture is disposed within the fitting base opening, while the displaceable pin is secured within the pin capture. The fitting socket includes a first fitting socket end, a second fitting socket end, a fitting socket opening therebetween. The second fitting socket end is secured to the second fitting base end. The valve is at least partially disposed within the fitting socket opening. When the displaceable pin is in an unloaded condition, the displaceable pin extends in a direction of the second fitting base end, and when the displaceable pin is in a loaded condition, the displaceable pin is compressed in a direction of the first fitting base end. The pin capture permits passage of the phase changing composition through the fitting base opening when the displaceable pin is in the unloaded condition or the loaded condition.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
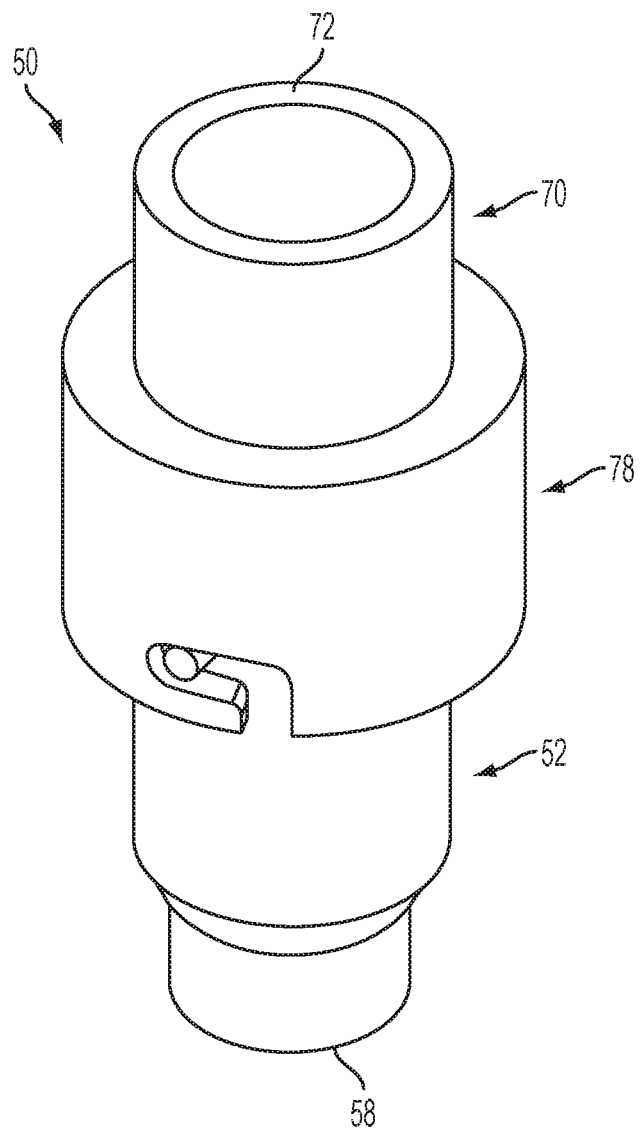
FIG. 1 is a perspective view of an embodiment of a present quick disconnect fitting.

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, "phase changing material" is intended to be broadly construed as any material that transitions between solid and liquid phases. In particular, "phase changing materials" include materials that transition between phases at temperature ranges typical for various applications, e.g., 45 to 140° C. for printing ink/wax materials, etc. It should be appreciated the foregoing definition in not limited to the recited temperature range, and other materials may also be used, e.g., chocolate, candy, resins, etc. Furthermore, as used herein, "Printer", "Printer System", "Printing System", "Printer Device", and "Printing Device" are interchangeable and encompasses any apparatus, such as a digital copier, bookmaking machine, facsimile machine, multi-function machine, etc. which performs a print outputting function for any purpose. As used herein, the term 'average' shall be construed broadly to include any calculation in which a result datum or decision is obtained based on a plurality of input data, which can include but is not limited to, weighted averages, yes or no decisions based on rolling inputs, etc.

Moreover, although any methods, devices or materials similar or equivalent to those described herein can be used in the practice or testing of these embodiments, some embodiments of methods, devices, and materials are now described.

The present disclosure sets forth a disconnect fitting adapted for use with a phase changing composition. In some embodiments, disconnect fitting 50 comprises fitting base 52, pin capture 54 and displaceable pin 56. Fitting base 52 comprises first fitting base end 58, second fitting base end 60 and fitting base opening 62 therebetween. Pin capture 54 is disposed within fitting base opening 62. Pin capture 54 may be secured within fitting base 52 by any suitable means, e.g., pin capture 54 may be welded to the inner surface of fitting base 52, or alternatively, the outer diameter of pin capture 54 may be threaded and arranged to engage complimentary threads on the inner surface of fitting base 52. Displaceable pin 56 is secured within pin capture 54. When displaceable pin 56 is in an unloaded condition, i.e., the arrangement depicted in FIGS. 4 and 5, displaceable pin 56 extends in a direction of second fitting base end 60, i.e., in the direction depicted by unidirectional arrow 64. When displaceable pin 56 is in a loaded condition, i.e., the arrangement depicted in FIG. 3, displaceable pin 56 is compressed in a direction of first fitting base end 58, i.e., in the direction depicted by unidirectional arrow 66. Pin capture 54 permits passage of phase changing composition 68 through fitting base opening 62 when displaceable pin 56 is in the unloaded condition (See FIG. 4) or the loaded condition (See FIG. 3).

In some embodiments, disconnect fitting 50 further comprises fitting socket 70. Fitting socket 70 comprises first fitting socket end 72, second fitting socket end 74, and fitting socket opening 76 therebetween. Second fitting socket end 74 is releasably secured to second fitting base end 60, forming a seal therebetween. It should be appreciated that additional sealing elements may be included between fitting socket 70 and fitting base 52, e.g., a gasket or o-ring.

In some embodiments disconnect fitting 50 further comprises sleeve 78 adapted to releasably secure fitting base 52 to fitting socket 70.

In some embodiments, disconnect fitting 50 further comprises valve 80 positioned adjacent to displaceable pin 56. Valve 80 may comprise ferromagnetic sphere 82 and ring magnet 84. It should be appreciated that ferromagnetic sphere 82 may be formed from any material having a high susceptibility to magnetization. Moreover, the interaction between ferromagnetic sphere 82 and ring magnet 84 assists with forming a sealed valve when disconnect fitting 50 is oriented in directions other than vertical, i.e., valve sealing is not affected by the direction of gravity relative to the seal. In some embodiments, disconnect fitting 50 further comprises valve seat 86 adjacent displaceable pin 56. In these embodiments, ring magnet 84 draws ferromagnetic sphere 82 toward valve seat 86. In some embodiments, fitting socket 70 further comprises valve seat 86 adjacent second fitting socket end 74, ferromagnetic sphere 82 is disposed within fitting socket opening 76, and ring magnet 84 is disposed outside of fitting socket 70 adjacent second fitting socket end 74. In these embodiments, ring magnet 84 draws ferromagnetic sphere 82 toward valve seat 86. In some embodiments, valve 80 is fully disposed within fitting socket opening 76.

It should be appreciated that other arrangements of valves may be used in various embodiments of the present disconnect fitting. For example, in some embodiments, fitting socket 70 further comprises valve seat 86 adjacent second fitting socket end 74, and valve 80 comprises sphere 82 and spring 88 imparting a biasing force on sphere 82 towards valve seat 86, i.e., in the direction of unidirectional arrow 90.

The present disconnect valve may be used in a variety of environments. For example, various embodiments of the disconnect valve may be used in printing devices, in food production and in chemical processing. In view of the foregoing, it should be appreciated that phase changing composition 68 may be selected from the following list of compositions: a solid ink; a thermoplastic resin; a metal alloy; an edible material; a food production material; and, combinations thereof. However, it should be understood that the foregoing list is not fully inclusive of all phase changing compositions that may be used with the present disconnect valve, and other materials fall within the scope of the claims. It should be appreciated that the present quick disconnect fitting can be used in a variety of temperature ranges, e.g., 45 to 140° C. for printer inks/waxes, 90 to 300° C. for thermoplastic resins, 101 to 200° C. for candies, 30 to 37° C. for chocolates, 30 to 50° C. for fats, etc. The foregoing temperature ranges are non-limiting and other ranges also fall within the scope of the claims.

The present disclosure also sets forth a printing device, e.g., printing device 92. In addition to other conventional components of various printing devices, printing device 92 comprises phase changing composition 68 and disconnect fitting 50. Disconnect fitting 50 is adapted for use with phase changing composition 68 and comprises fitting base 52, pin capture 54, displaceable pin 56, fitting socket 70 and valve 80. Fitting base 52 comprises first fitting base end 58, second fitting base end 60 and fitting base opening 62 disposed therebetween. Pin capture 54 is disposed within fitting base opening 62, while displaceable pin 56 is secured within pin capture 54. Fitting socket 70 comprises first fitting socket end 72, second fitting socket end 74, and fitting socket opening 76 disposed therebetween. Second fitting socket end 74 is secured to second fitting base end 60. Valve 80 is at least partially disposed within fitting socket opening 76. When displaceable pin 56 is in an unloaded condition (See FIGS. 4 and 5), displaceable pin 56 extends in a direction of the second fitting base end 60, and when displaceable pin 56 is in a loaded condition (See FIG. 3). Displaceable pin 56 is compressed in a direction of first fitting base end 58. Pin capture 54 permits passage of phase changing composition 68 through fitting base opening 62 when displaceable pin 56 is in the unloaded condition or the loaded condition. Disconnect fitting 50 is arranged between ink reservoir 94 and print head 96. Phase changing composition 68 is stored in ink reservoir 94.

Figure 2:
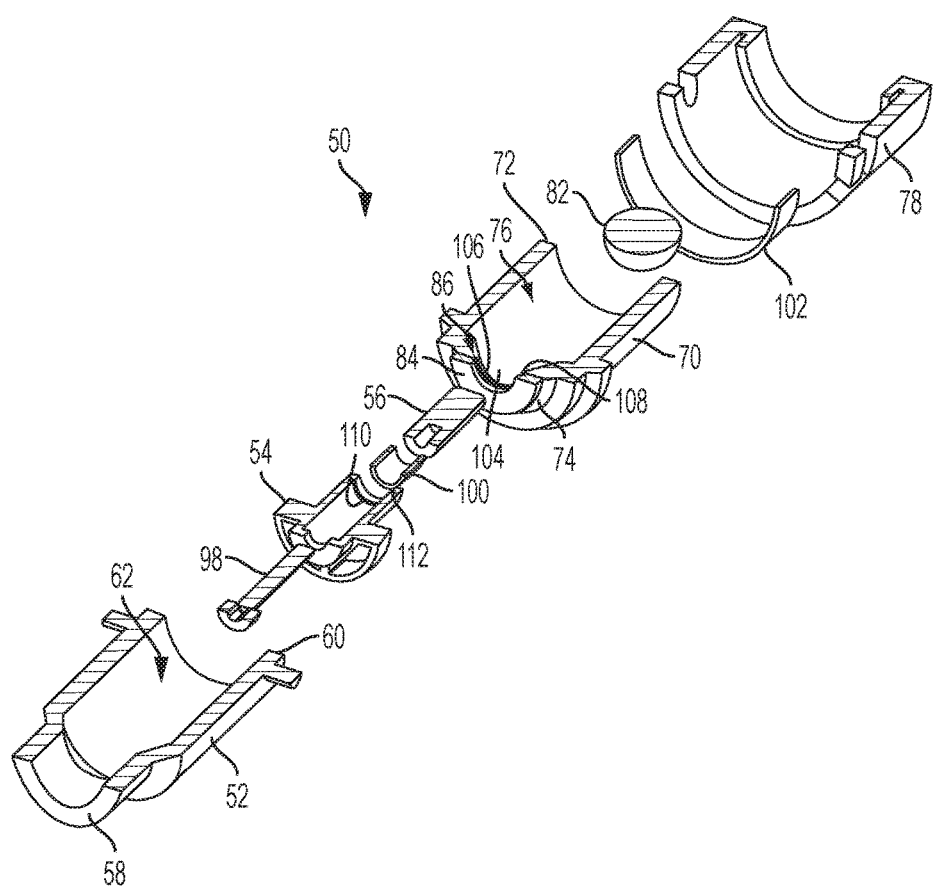
FIG. 2 is an exploded cross sectional perspective view of an embodiment of a present quick disconnect fitting.

An embodiment of the quick disconnect valve described above is depicted in FIG. 2 as an exploded view of components that form a particular embodiment of a present fitting. The overall size of the present fitting is small and comparable to known quick disconnect fittings used with non-phase changing materials, e.g., approximately two inches. The size is smaller than other fittings that accommodate phase changing materials. Quick disconnect fitting 50 comprises fitting base 52 where smaller end 58 may be threaded into the end location of material 68. Screw 98 captures spring 100 and pin 56 within pin capture portion 54. Fitting socket 70 includes adhered magnet 84 and encapsulates shut off sphere 82 while allowing for multiple connections to different inputs, e.g., barbs, threaded inputs, etc. External spring 102 allows sleeve 78 to firmly connect fitting socket 70 to fitting base 52. However, disconnect fitting 50 may also function in the absence of external spring 102.

Figure 3:
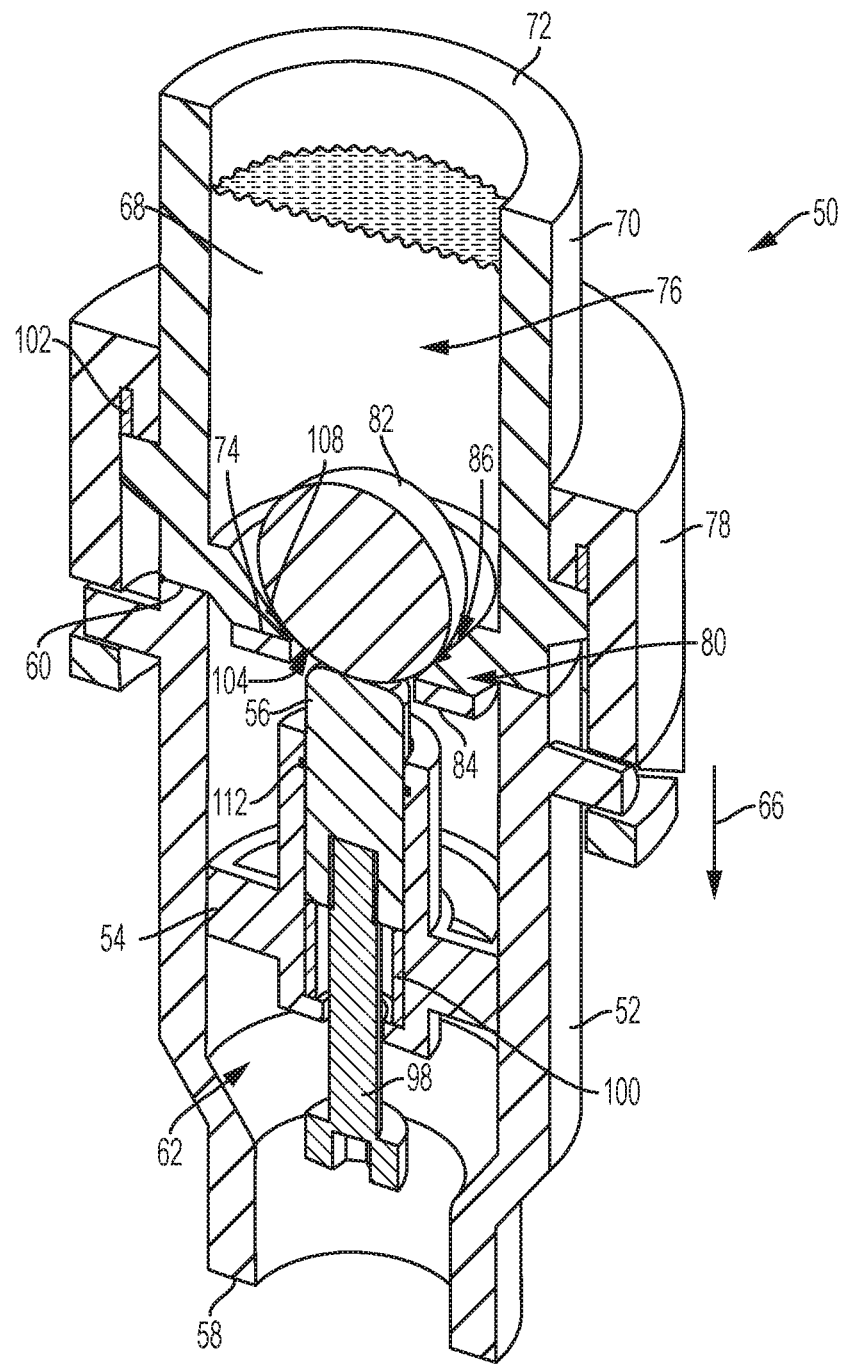
FIG. 3 is a cross sectional perspective view of an embodiment of a present quick disconnect fitting having a phase changing material in a solid state contained therein.

FIG. 3 depicts disconnect fitting 50 in a state when fitting socket 70 is secured to fitting base 52 while phase changing material 68 is in a solid state. When material 68 has cooled and solidified, shut off sphere 82 is immobilized by solid material 68 behind it. To make the connection in preparation of the machine heating up and material 68 liquefying, internal spring 100 compresses as pin 56 comes into contact with sphere 82. Because there is no material in cavity 62, pin 56 has room to be displaced. In addition, because material 68 would drain downwards, screw 98 also has the ability to be displaced. Because internal spring 100 is encapsulated within pin capture 54 and material 68 flows downwards as it changes state, pin 56 and screw 98 are allowed to shift to make the connection while material 68 is in the solid state. An alternative to the foregoing embodiment includes a nut that fastens and retains pin 56 within pin capture 54 that still allows for vertical movement of pin 56 regardless of whether or not the material drains downwards. This alternate embodiment also provides the benefit of ease of assembly. Once in place, sleeve 78 rotates a quarter turn to lock the two halves of fitting 50 in place. In making the connection, external spring 102 compresses while sleeve 78 locks the two halves of fitting 50 together.

Figure 4:
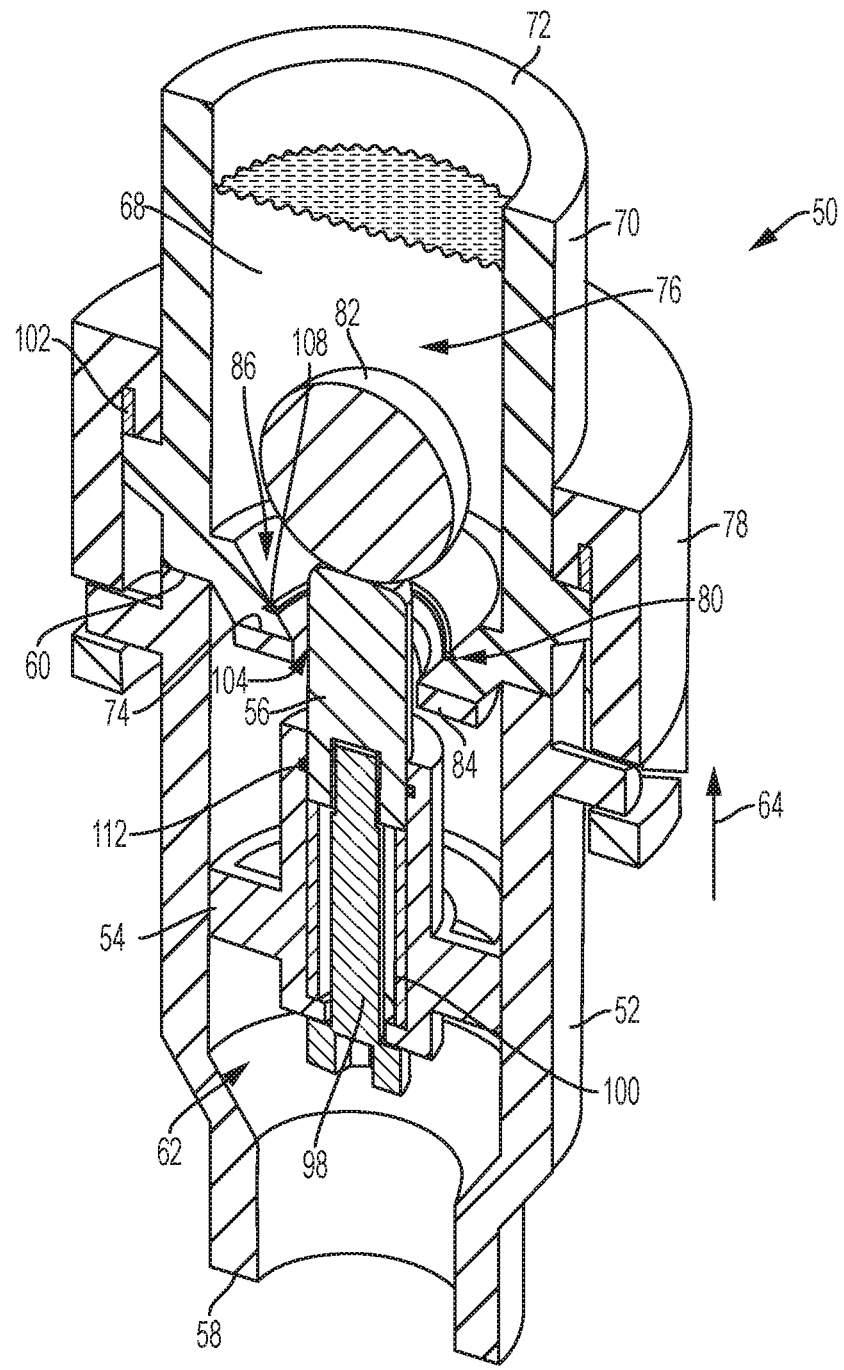
FIG. 4 is a cross sectional perspective view of an embodiment of a present quick disconnect fitting having a phase changing material in a liquid state contained therein.
Figure 5:
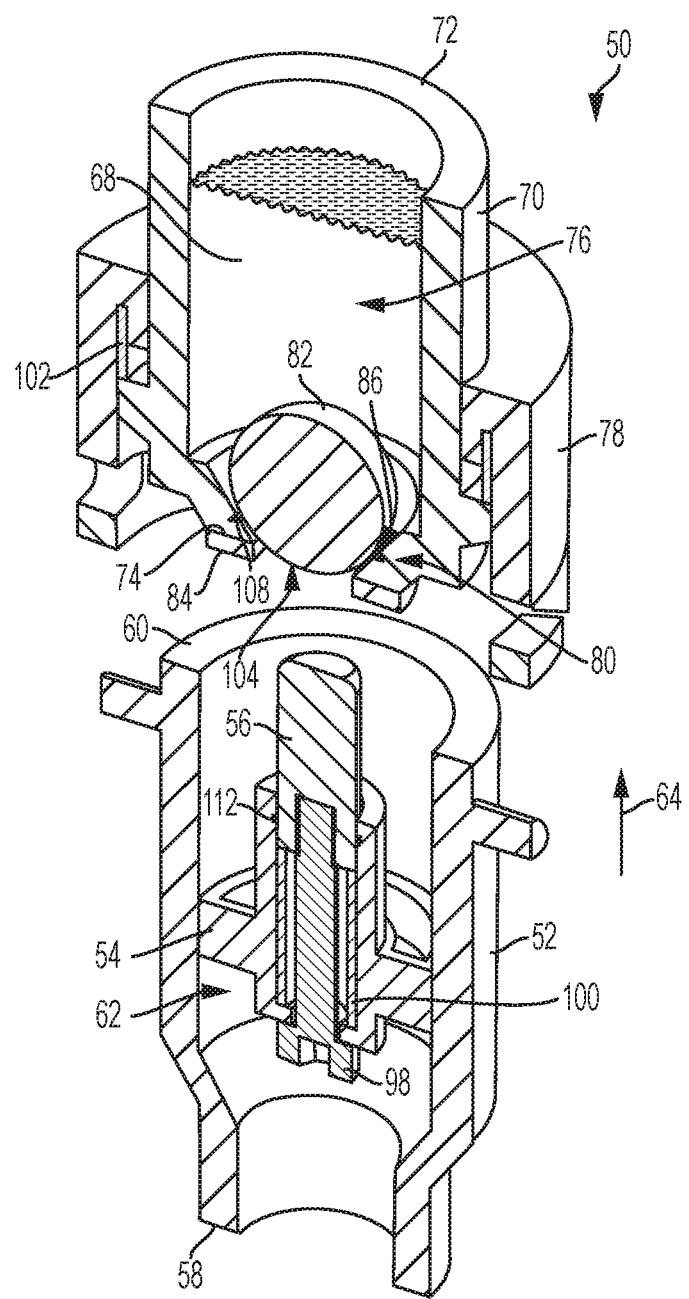
FIG. 5 is a cross sectional perspective view of an embodiment of a present quick disconnect fitting having a disconnected fitting base and fitting socket.
Figure 6:
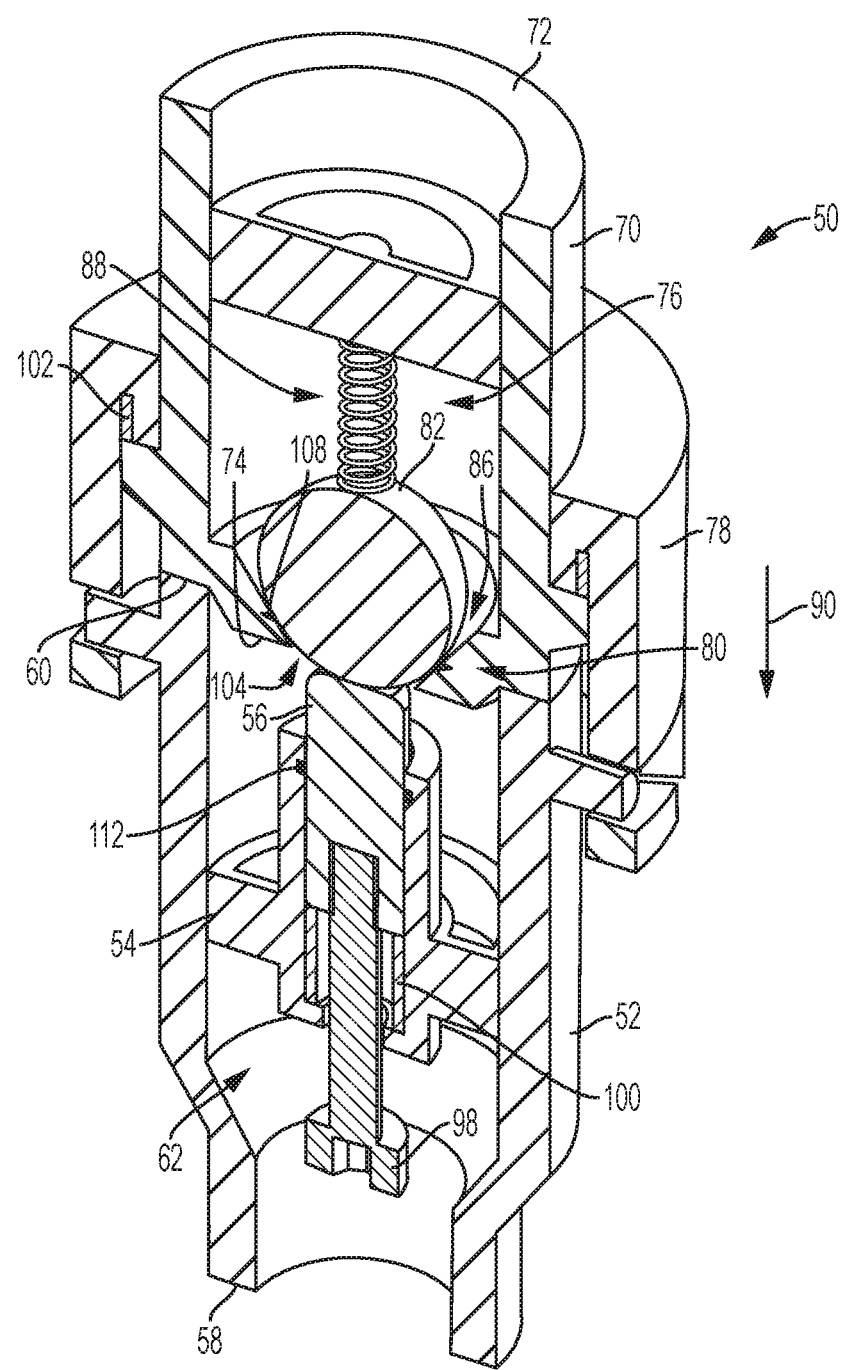
FIG. 6 is a cross sectional perspective view of an embodiment of a present quick disconnect fitting having a phase changing material in a solid state contained therein and including a spring arranged to bias a sphere against its seat; and, FIG. 7 is schematic view of a printing system including an embodiment of a present quick disconnect fitting.
Figure 7:
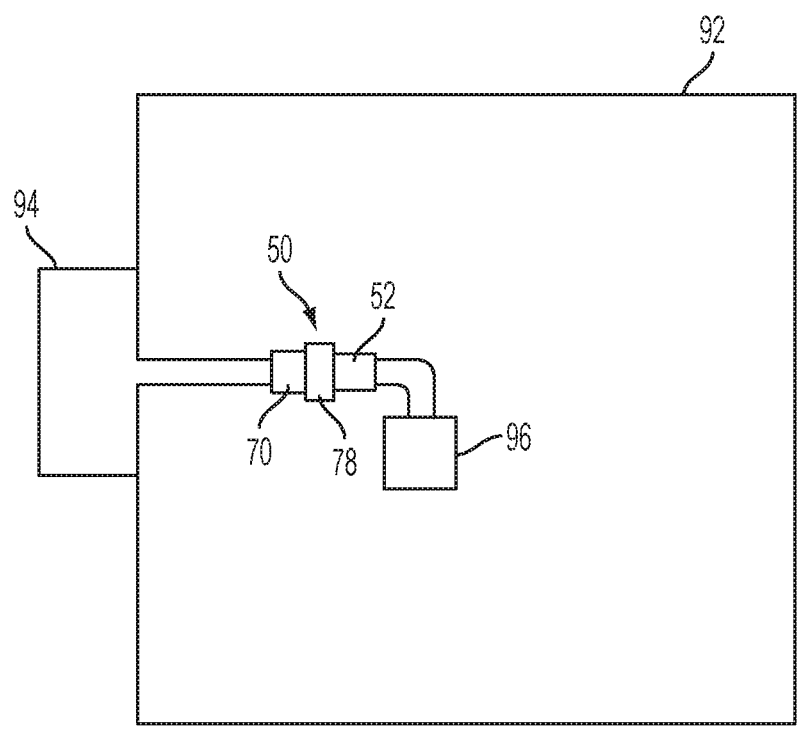

FIG. 4 depicts quick disconnect fitting 50 with phase changing material 68 in a fluid state. Once material 68 is heated to its melting point, material 68 will become a fluid, i.e., liquefy, allowing spring 100 to push pin 56 in the direction of unidirectional arrow 64 and thus sphere 82 upwards. This allows material 68 to flow around sphere 82 and through orifice 104 of fitting socket 70. O-ring groove 106 holds o-ring 108 within socket 70 to prevent excess material 68 from leaking around sphere 82 when socket fitting 70 is disconnected as is shown in FIG. 5. Additionally, o-ring groove 110 holds o-ring 112 within pin capture 54 to prevent material in a liquid state from enter pin capture 54 and thereby disrupting the function of screw 98, spring 100 and displaceable pin 56.

FIG. 5 depicts quick disconnect fitting 50 in its disconnected state. Without the force of spring 100 and pin 56, sphere 82 has the ability to sink downwards because of gravity and the flow direction of material 68, i.e., the direction depicted by unidirectional arrow 90. In addition, magnet 84 at the base of fitting 70 serves to draw and keep sphere 82 in a shutoff position regardless of the orientation of fitting 70. The foregoing position of sphere 82 shuts off valve 80, allowing for a clean disconnect. If fitting 70 is disconnected while material 68 is in a solid state, fitting 70 can still reconnect, though an operator runs the risk of an amount of residual material 68 coming from fitting socket 70 if material 68 heats up and fitting 70 is disconnected.

The foregoing embodiments are particularly beneficial for inks that are phase changing. Often times, the fitting base is connected to a print head where ink is filling and the socket half is connected to a tube which is in turn connected to an ink reservoir. If the print heads need to be switched out or need to undergo maintenance, operators do not have to wait for the machine to cool in order to swap print heads and reconnect the fitting. Thus, the present fitting overcomes problems with known fittings described above. Using the present fitting, operators can disconnect print heads while the machine is running, allowing the sphere to shut off fluid flow, thereby saving time and money while still allowing the fitting to be reconnected later even if the material solidifies.

The present quick disconnect fitting may be used with a variety of phase changing material, such as inks used in 2D and 3D printing and fats used for food processing/production. The present quick disconnect fitting overcomes failures of known quick disconnect fitting alternatives, e.g., many fluid fittings with at least one shutoff valve require some vertical displacement in order to reconnect. The present quick disconnect fitting solves the problems of known fittings by providing a smaller fluid fitting that can make connections even if the fitting is disconnected while the phase changing material is in a fluid state and subsequently left to solidify.

The present disconnect fitting provides the ability to shut off and disconnect a phase changing material line for service regardless of the state or phase of the material in the line, i.e., liquid or solid. Unlike known quick disconnect fittings, the two halves of the present fitting can make a secure connection to each other even if the phase changing material is in its liquid phase at the time of disconnection and the material solidifies prior to reconnection. Moreover, the present disconnect fitting is compact and readily manufacturable. It should be appreciated that all of the foregoing embodiments may be combined in a variety of arrangements. For example, the valve included in the present disconnect fitting may include both a ring magnet and a biasing spring. Such combinations of various embodiments are within the scope of the recited claims.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A disconnect fitting adapted for use with a phase changing composition comprising:
   a fitting base comprising a first fitting base end, a second fitting base end and a fitting base opening therebetween;
   a pin capture disposed within the fitting base opening; and,
   a displaceable pin secured within the pin capture; a first spring; and, a screw arranged to capture the first spring and the displaceable pin within the pin capture;
   wherein when the displaceable pin is in an unloaded condition, the displaceable pin extends in a direction of the second fitting base end, and when the displaceable pin is in a loaded condition, the displaceable pin is compressed in a direction of the first fitting base end, and the pin capture permits passage of the phase changing composition past the displaceable pin when the displaceable pin is in the unloaded condition and the loaded condition.

2. The disconnect fitting of claim 1 further comprising:
   a fitting socket comprising a first fitting socket end, a second fitting socket end and a fitting socket opening therebetween, the second fitting socket end releasably secured to the second fitting base end.

3. The disconnect fitting of claim 2 further comprising:
   a sleeve adapted to releasably secure the fitting base to the fitting socket.

4. The disconnect fitting of claim 1 further comprising:
   a valve positioned adjacent to the displaceable pin.

5. The disconnect fitting of claim 4 wherein the valve comprises a ferromagnetic sphere and a ring magnet.

6. The disconnect fitting of claim 5 further comprising:
   a valve seat adjacent the displaceable pin, wherein the ring magnet draws the ferromagnetic sphere toward the valve seat.

7. The disconnect fitting of claim 1 wherein the phase changing composition is selected from the group consisting of: a solid ink; a thermoplastic resin; a metal alloy; an edible material; a food production material; and, combinations thereof.

8. A disconnect fitting adapted for use with a phase changing composition comprising:
   a fitting base comprising a first fitting base end, a second fitting base end and a fitting base opening therebetween;
   a pin capture disposed within the fitting base opening;
   a displaceable pin secured within the pin capture; a first spring; and, a screw arranged to capture the first spring and the displaceable pin within the pin capture;
   a fitting socket comprising a first fitting socket end, a second fitting socket end, a fitting socket opening therebetween, the second fitting socket end secured to the second fitting base end; and,
   a valve at least partially disposed within the fitting socket opening,
   wherein when the displaceable pin is in an unloaded condition, the displaceable pin extends in a direction of the second fitting base end, and when the displaceable pin is in a loaded condition, the displaceable pin is compressed in a direction of the first fitting base end, and the pin capture permits passage of the phase changing composition past the displaceable pin when the displaceable pin is in the unloaded condition and the loaded condition.

9. The disconnect fitting of claim 8 wherein the valve comprises a ferromagnetic sphere and a ring magnet.

10. The disconnect fitting of claim 9 wherein the fitting socket further comprises a valve seat adjacent the second fitting socket end, the ferromagnetic sphere is disposed within the fitting socket opening, the ring magnet is disposed outside of the fitting socket adjacent the second fitting socket end and the ring magnet draws the ferromagnetic sphere toward the valve seat.

11. The disconnect fitting of claim 8 wherein the valve is fully disposed within the fitting socket opening.

12. The disconnect fitting of claim 11 wherein the fitting socket further comprises a valve seat adjacent the second fitting socket end, the valve comprises a sphere and a second spring imparting a biasing force on the sphere towards the valve seat.

13. The disconnect fitting of claim 8 further comprising:
    a sleeve adapted to releasably secure the fitting base to the fitting socket.

14. The disconnect fitting of claim 8 wherein the phase changing composition is selected from the group consisting of: a solid ink; a thermoplastic resin; a metal alloy; an edible material; a food production material; and, combinations thereof.

15. A printing device comprising:
    a phase changing composition; and,
    a disconnect fitting adapted for use with the phase changing composition comprising:
       a fitting base comprising a first fitting base end, a second fitting base end and a fitting base opening therebetween;
       a pin capture disposed within the fitting base opening;
       a displaceable pin secured within the pin capture; a first spring; and, a screw arranged to capture the first spring and the displaceable pin within the pin capture;
       a fitting socket comprising a first fitting socket end, a second fitting socket end, a fitting socket opening therebetween, the second fitting socket end secured to the second fitting base end; and,
       a valve at least partially disposed within the fitting socket opening,
       wherein when the displaceable pin is in an unloaded condition, the displaceable pin extends in a direction of the second fitting base end, and when the displaceable pin is in a loaded condition, the displaceable pin is compressed in a direction of the first fitting base end, and the pin capture permits passage of the phase changing composition past the displaceable pin when the displaceable pin is in the unloaded condition and the loaded condition.

16. The printing device of claim 15 wherein the valve comprises a ferromagnetic sphere and a ring magnet.

17. The printing device of claim 16 wherein the fitting socket further comprises a valve seat adjacent the second fitting socket end, the ferromagnetic sphere is disposed within the fitting socket opening, the ring magnet is disposed outside of the fitting socket adjacent the second fitting socket end and the ring magnet draws the ferromagnetic sphere toward the valve seat.

18. The printing device of claim 15 wherein the valve is fully disposed within the fitting socket opening.

19. The printing device of claim 18 wherein the fitting socket further comprises a valve seat adjacent the second fitting socket end, the valve comprises a sphere and a second spring imparting a biasing force on the sphere towards the valve seat.

20. The printing device of claim 15 further comprising:
   a sleeve adapted to releasably secure the fitting base to the fitting socket.

21. The printing device of claim 15 wherein the phase changing composition is selected from the group consisting of: a solid ink; a thermoplastic resin; a metal alloy; an edible material; a food production material; and, combinations thereof.

* * * * *